（12) United States Patent
Ardiri (10) Patent No.: US 11,997,165 B2
(45) Date of Patent: May 28, 2024

(54) SYSTEM AND METHOD FOR OPTIMIZING DATA COMMUNICATION OF INTERNET OF THINGS (IOT) DEVICES

(71) Applicant: RIoT Secure AB, Farsta (SE)

(72) Inventor: Aaron Ardiri, Margaret River (AU)

(73) Assignee: RIoT Secure AB, Farsta (SE)

( * ) Notice: Subject to any disclaimer, the term of this patent is extended or adjusted under 35 U.S.C. 154(b) by 0 days.

(21) Appl. No.: 18/120,108

(22) Filed: Mar. 10, 2023

(65) Prior Publication Data

US 2023/0216922 A1    Jul. 6, 2023

(51) Int. Cl.
*H04L 67/12* (2022.01)
*G16Y 20/20* (2020.01)
*G16Y 40/10* (2020.01)
*H04L 47/36* (2022.01)

(52) U.S. Cl.
CPC .............. *H04L 67/12* (2013.01); *H04L 47/36* (2013.01); *G16Y 20/20* (2020.01); *G16Y 40/10* (2020.01)

(58) Field of Classification Search
CPC ......... H04L 67/12; H04L 47/36; G16Y 20/20; G16Y 40/10
See application file for complete search history.

(56) References Cited

U.S. PATENT DOCUMENTS 10,091,329 B2    10/2018    Kuo et al.
11,327,737 B2 *   5/2022    Park ........................ G06F 8/71
11,349,753 B2     5/2022    Schooler et al.
11,677,858 B2 *   6/2023    Seed ..................... H04L 67/564
                                                            709/201
2017/0064491 A1 * 3/2017    Mirza .................... H04L 43/106
2018/0059716 A1 * 3/2018    Cronin .................... G06F 1/163
2019/0158355 A1 * 5/2019    Ramisetty ........... H04L 63/0853

FOREIGN PATENT DOCUMENTS

CN          112039925 B         2/2021
KR      20070045282 A    *      5/2007
WO         2018170773 A1        9/2018

* cited by examiner

*Primary Examiner* — Soe Hlaing
(74) *Attorney, Agent, or Firm* — Shumaker, Loop & Kendrick, LLP (57) ABSTRACT

The present subject matter discloses a system and method for optimizing data communication of Internet of Things (IoT) devices. The system comprises a collection of IoT devices, an IoT server, a management console, third party IoT gateways and user devices. The IoT device is connected to a sensor or an actuator. The IoT device identifies attributes of the sensor or the actuator. Further, the IoT device receives raw data generated by the sensor or the actuator. Subsequently, the IoT device defines data types for the raw data based on the attributes and define bit stream storage for the data types. The IoT device may optimize data-transmission size of the data types and bit stream storage using a communication protocol and transmit the raw data to the IoT server. The IoT server may transcode the raw data into a desired format and relay transcoded data to a management console.

7 Claims, 7 Drawing Sheets

Packet Properties

| | |
|---|---|
| Name | GPS |
| Mode | ○ sensor ○ actuator |
| Identifier | + |

Components

| Order | Name | Format | Actions |
|---|---|---|---|
| | | No filter | |
| ↓ | latitude | scalar | ✎ 🗑 📄 |
| ↑ ↓ | longitude | scalar | ✎ 🗑 📄 |
| ↑ ↓ | altitude | scalar | ✎ 🗑 📄 |
| ↑ ↓ | speed | scalar | ✎ 🗑 📄 |
| ↑ ↓ | course | scalar | ✎ 🗑 📄 |
| ↑ ↓ | satellites | integer | ✎ 🗑 📄 |
| ↑ ↓ | fix | integer | ✎ 🗑 📄 |
| ↑ | quality | scalar | ✎ 🗑 📄 |
| | | | ➕ |

SYSTEM AND METHOD FOR OPTIMIZING DATA COMMUNICATION OF INTERNET OF THINGS (IOT) DEVICES

PRIORITY INFORMATION

The present application does not claim priority from any other application.

TECHNICAL FIELD

The present subject matter described herein, in general, relates to Internet of Things (IoT) device communications. Particularly, the invention describes a system and a method for data communication of IoT devices over a network.

BACKGROUND

Nowadays, Internet of Things (IoT) devices are commonly used in both consumer and industrial applications. The IoT devices typically provide raw data (for example real-time or historical information) from sensors and actuators to management consoles via an IoT server. The raw data is visualized through the management consoles and accessible on a variety of devices, including mobile phones and laptops. The management consoles also provide instructions to control the actuators. The sensors provide the raw data by analyzing environmental or physical interactions. The raw data is further processed by a microcontroller of the IoT device. The microcontroller communicates the processed raw data to the IoT server. The IoT server can provide instructions to microcontroller to control the actuators.

In general, the microcontrollers of the IoT devices are resource-constrained microcontrollers that have limited CPU power, Random Access Memory (RAM), and flash (programming) memory. Some IoT devices are enabled with provisions to operate in low/narrow bandwidth network communications. The low/narrow bandwidth network communications have some restrictions that include a number of uplink/downlink messages, frequency of communication and size of data transmission. These low/narrow bandwidth network communications are applicable for industry-specific and consumer solutions.

In some IoT devices, proprietary technology or piggyback on existing infrastructures is utilized for data communications. However, a lack of resources confines the implementation of advanced security protocols and feasibility to perform firmware updates through a remote operation. When firmware updates are required, then it typically relies on wireless communication technologies such as narrowband, cellular, 3G, Wi-Fi, and the like. While efforts are being made to design and implement standards specifically for resource-constrained devices, no comprehensive standard communication protocols have yet been created to increase the effectiveness of resource utilization while also enhancing security measures and offering lifecycle management of the IoT devices. It is challenging to implement cutting-edge security protocols that are accepted by the industry while also enhancing the security of handling IoT device data in terms of privacy, integrity, encryption, authenticity, and non-repudiation in a resource-constrained environment. Therefore, there is a need for a method and system to manage secure communications between IoT devices and an IoT server, allowing management consoles or third-party gateways to visualize sensor information and control actuators with efficient resource utilization.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and method for optimizing data communication of Internet of Things (IoT) devices over a network. This summary is not intended to identify essential features of the claimed subject matter nor is it intended for use in determining or limiting the scope of the claimed subject matter.

According to an embodiment, the present invention provides the Internet of Things (IoT) device for optimizing data communication over a network. The IoT device comprises a first processor, and a memory. The first processor is configured to execute program instructions stored in the memory. The IoT device may connect to at least one of a sensor and an actuator. The IoT device may identify attributes of at least one of the sensor and the actuator. In an embodiment, the IoT device may receive raw data generated by the sensor or the actuator in case only one of the sensor and the actuator is connected to the IoT device. The raw data is received based on the attributes. The IoT device may define data types of the raw data based on the attributes. Further, the IoT device may define a bit stream storage for each of the data types based on the attributes. The bit stream storage may also be referred to as compact storage. The compact storage refers to an amount of storage limit set for a data type. The amount of storage limit set may be measured in bits. The IoT device may optimize data transmission size of the data types, and the compact storage using a communication protocol. Finally, the IoT device may transmit optimized raw data to an IoT server. It may be noted that the optimized raw data may comprise the raw data having optimized data transmission size of the data type.

According to another embodiment, the present invention provides a management console for communicating data from one or more Internet of Things (IoT) Devices. In an embodiment, the management console may receive transcoded data from an IoT server or a third party IoT gateway. The transcoded data may be generated at the IoT server based on optimized raw data received from an IoT device. It may be noted that the transcoded data may comprise the optimized raw data transcoded into a desired format. In an embodiment, the management console may send transcoded data to the IoT server or a third party IoT gateway. The transcoded data may be processed at the IoT server and optimized for sending the transcoded data to an IoT device. Further, the management console may connect a user device to the IoT server that communicates with the IoT device through a network. Furthermore, the management console may display the transcoded data (i.e. real time data) and historical data of a sensor. Further, the management console may receive control data from the user device to change operating states of an actuator.

According to an embodiment, the present invention provides a system for optimizing data communication of Internet of Things (IoT) devices over a network. The system for optimizing data communication of Internet of Things (IoT) devices over a network comprises an Internet of things (IoT) device, an Internet of things (IoT) server, a management console, and a user device. The IoT device comprises a memory and a first processor to execute the instructions stored in the memory. The IoT device may connect to at least one of a sensor and an actuator. The IoT device may identify attributes of at least one of the sensor and the actuator. The IoT device may receive raw data generated by at least one of the sensor and the actuator. It should be noted that the raw data of the sensor comprises environmental data, positional data, automation data, computed data, contextual data, situational data, and actionable data. The raw data received from the actuator comprises control data to change operating states of the actuator. Further, the IoT device may define data types of the raw data based on the attributes. Furthermore, the IoT device may define compact storage for each of the data types based on the attributes. That is, the compact storage is defined in bit stream concepts to optimize the data types. Subsequently, the IoT device may further optimize data transmission size of the data types and compact storage in bit stream concepts (i.e. data definitions) for the raw data using a communication protocol. The IoT device may communicate optimized raw data to the IoT server in the network. It should be noted that the IoT server is connected to the IoT device. The IoT server comprises a second processor, and a memory storing machine-readable instructions. The IoT server may receive the optimized raw data from the IoT device. Further, the IoT server may transcode the optimized raw data into a desired format at the IoT server and relay a transcoded data to at least one of a management console and a third party IoT gateway.

According to the embodiment, the present invention provides a computer program product implemented in a system for optimizing data communication of Internet of Things (IoT) devices over a network. The system for optimizing data communication of Internet of Things (IoT) devices comprises an IoT device, an IoT server, a management console, and a plurality of user devices. The IoT device comprise a memory and a first processor to execute the instructions stored in the memory. The IoT device is connected to at least one of a sensor and an actuator. The IoT device may identify attributes of at least one of the sensor and the actuator. The IoT device may receive raw data generated by at least one of the sensor and the actuator based on the attributes. The IoT device may define data types of the raw data based on the attributes. Furthermore, the IoT device may define compact storage for each of the data types based on the attributes. The compact storage is defined in bit stream concepts. Subsequently, the IoT device may optimize data transmission size of the data types and compact storage using a communication protocol. The IoT device may communicate optimized raw data to the IoT server in a network. The IoT server comprises a second processor, and a memory storing machine-readable instructions. The IoT server may receive the optimized raw data from the IoT device. Further, the IoT server may transcode the optimized raw data into a desired format. Furthermore, the IoT server may relay a transcoded data to a management console.

It is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise.

The present disclosure will become apparent from the detailed description given below. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures, however, the invention is not limited to the specific system and method for optimizing data communication of IoT devices over a network disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skilled in the art to practice the embodiments herein. Accordingly, the examples should not be construed as limiting the scope of the embodiments herein.

Some embodiments of this disclosure, illustrating all its features, will now be discussed in detail. The words "identifying", "optimizing", "communicating", "defining," "updating," "transcoding" "displaying" "relaying" "transmitting" and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or optimization of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

As mentioned above, there is a need for a system and a method for managing secure communications between IoT devices and an IoT server with efficient resource utilization. Further, there is a need for a system to reduce cost of deployment, maintenance and evolution. The embodiments herein achieve this by providing a system and a method for optimizing data communication of IoT devices over a network using a communication protocol. Referring now to the drawings, and more particularly to FIGS. 1 through 5, where similar reference characters denote corresponding features consistently throughout the figures, there are shown preferred embodiments.

In existing IoT devices, a typical message from an IoT device includes a status message along with details regarding attributes of the IoT device and communication headers that are included in the status message. The communication headers are used to transfer additional information between the IoT device and an IoT server through the request header and response header. For instance, in an existing GNSS location tracking device, the typical status message from an IoT device includes details of the attributes such as latitude, longitude, altitude, course, fix, quality, satellites and speed. The attributes of the sensor and the actuator may comprise but are not limited to parameters, types, labels and so on of the sensor and the actuator. The data transmission size of the status message may be approximately 200 bytes.

It should be noted that it may also be possible to send multiple independent sensor data within a same payload. Below mentioned is a typical message from the IoT device containing a single GNSS location record. For example,

```
"packets": [
    {
        "ts":1662026150250,
        "GPS":
        {
            "latitude":59.6559333,"longitude":17.9444583,"altitude":18.29,
               "course":255.6,"fix":1,"quality":1.1,"satellites":9"speed":0
        }
    }
]
```

Further in the existing GNSS location tracking device, the communication header includes the request header and response header. Below mentioned is an example request header that includes a request message header, a blank line to separate the request message header and a body of the request message.

The request message header comprises a request line and request headers.

```
PUT /tenant/x/device/y HTTP/1.1    /* request line                    */
Host: iot.riotsecure.io       /* request header starts here */
Accept: image/gif, image/jpeg, */*
Accept-language: en-us
Accept-encoding: gzip, deflate
User-Agent: Mozilla/4.0
Content-length: 200           /* request header end here */
/* blank line to separate the request message header andthe body */
"packets": [                  /* response header body         */
    {
        "ts":1662026150250,
        "GPS":
        {
            "latitude":59.6559333,"longitude":17.9444583,"altitude":18.29,
               "course":255.6,"fix":1,"quality":1.1,"satellites":9"speed":0
        }
    }
]
```

Below mentioned is an example response header that includes a response message header, a blank line to separate the response message header, and a body of the response message. The response message header comprises a status line and response headers.

```
HTTP/1.1 204 OK                         /* status line       */
Date: Sun, DD MMM YYYY hh:mm:ss GMT /* request header starts here */
Server: Apache/ 1.3.29 (Win32)
Last modified: Sun, DD MMM YYYY
ETag: "0-23-4024c3a5"
Accept-Ranges: bytes
Content-length: 0
Connection: close
Content-Type: text/html                  /* request header ends here */
/* blank line to separate the request message header and the body */
    /* response header body */
```

It may be noted that the request header and the response header consume additional bytes that increase the overall data transmission size of the GNSS location tracking device to approximately 2000 bytes (from the original 200 bytes). This results in inefficient usage of resources for the data communication. Whereas, the present invention provides a solution to remove the communication overheads mentioned above for existing devices by defining data types and compact storage in bit stream concepts for the raw data. The compact storage refers to an amount of storage limit set for a data type. The amount of storage limit set may be measured in bits. The raw data is received based on the attributes of at least one of a sensor and an actuator. Further, the data types and compact storage in bit stream concepts for the raw data may be optimized using a raw socket communication protocol. The data types and compact storage in bit stream concepts for the raw data may reduce a resource requirement for data communication between the IoT device and IoT server.

The Internet of Things (IoT) devices may include, but are not limited to, physical objects with sensors, actuators such as security devices, process monitoring devices, smart activity trackers, and the like.

The user devices may include, but are not limited to, laptops, mobile devices, smartphones, tablets, computers, and any other electronic device capable of being connected to network. The management consoles have a control over all the IoT devices that are connected. The management console usually access, monitors or visualizes status information of the IoT devices via the IoT server and provides ability to manage firmware updates for IoT devices.

According to an embodiment, the present invention provides a system for optimizing data communication of IoT devices over a network. The system comprises one or more Internet of things (IoT) devices, an Internet of things (IoT) server, a management console, and a plurality of user devices. An IoT device comprise a memory and a first processor coupled to the memory. The first processor may be configured to execute program instructions stored in the memory. Initially, the IoT device may be connected to at least one of a sensor and an actuator. Further, the IoT device may identify attributes of at least one of the sensor and the actuator. The IoT device may receive raw data generated by at least one of the sensor and the actuator that are connected to the IoT device. The IoT device may define data types for the raw data based on the attributes of the sensor and actuator. In addition, the IoT device may define compact storage for each of the data types based on the attributes. The compact storage is defined in bit stream concepts. That is, compact representation for each of the data types in bit stream concepts may be defined. Further, the data transmission size of the data types, and the compact storage may be optimized using a communication protocol. The optimized raw data may be communicated to an IoT server. Finally, the optimized raw data may be transcoded into the desired format at the IoT server, and a transcoded data may be relayed to a management console. Optionally, the transcoded data may be communicated between IoT server and the management console via a third party IoT gateway. It may be noted that the transcoded data may comprise the optimized raw data transcoded into a desired format.

While aspects of described system and method for optimizing data communication of IoT devices over a network are implemented on the computer program of the IT-enabled application, it may be implemented in any number of different computing systems, environments, and/or configurations, the embodiments are described in the context of the following exemplary system.

The input/output user interface can include a display; a positional input device, such as a mouse, touchpad, touchscreen, or the like; a keyboard; or other suitable human or machine interface devices. The I/O UI can be coupled to the processor. Other interface devices that permit a user to program or otherwise use a computing device can be provided in addition to or as an alternative to a display. In some implementations, the I/O UI can include a display, which can be a liquid crystal display (LCD), a cathode-ray tube (CRT), a light emitting diode (LED) display (e.g., an OLED display), or other suitable display.

Figure 1:
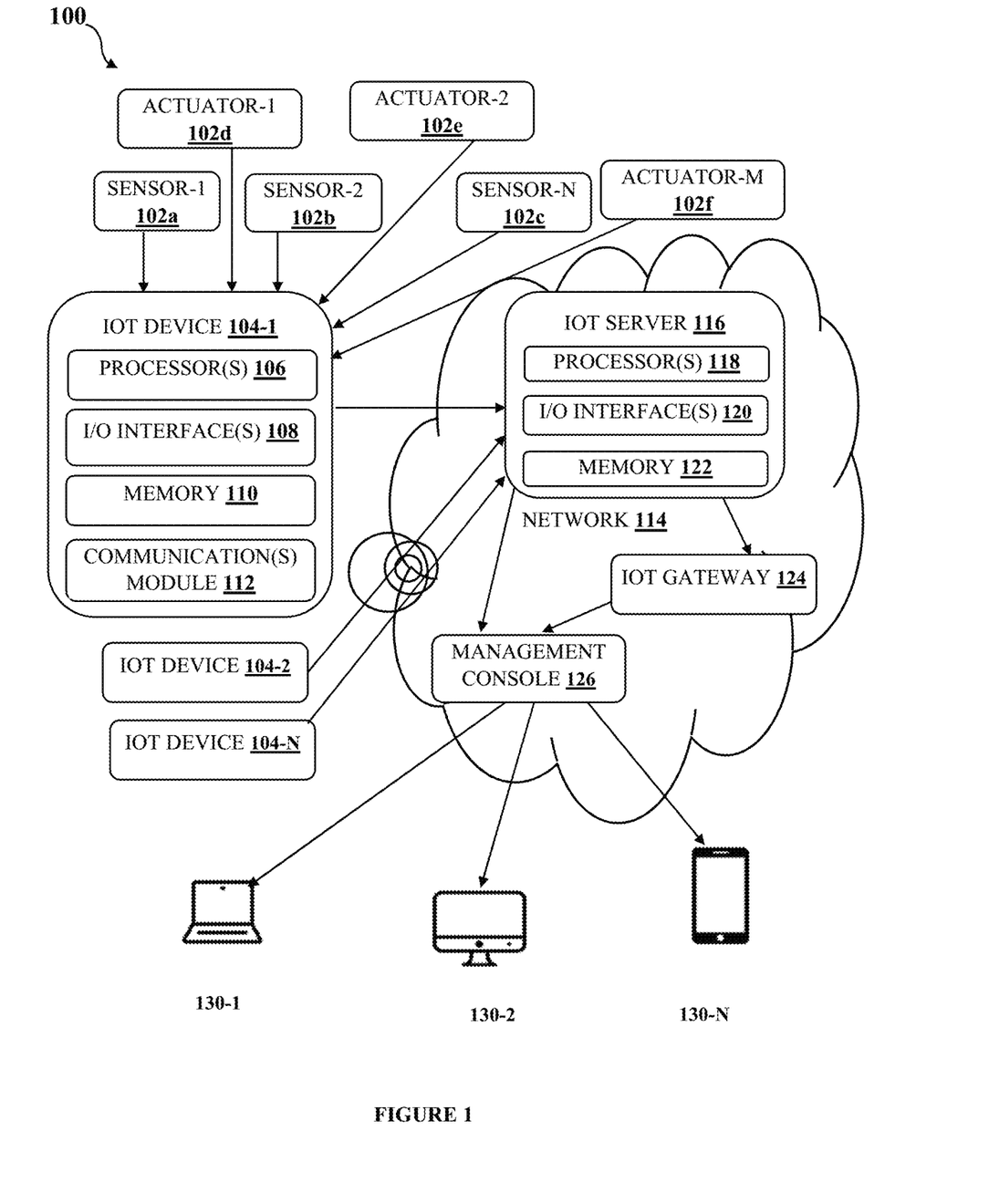
FIG. 1 illustrates a network implementation for optimizing data communication of IoT devices over a network, in accordance with an embodiment of the present subject matter.

Referring now to FIG. 1, a network implementation of a system 100 for optimizing data communication of Internet of Things (IoT) devices over a network is disclosed. The system 100 comprises one or more Internet of things (IoT) devices (104-1, 104-2, 104-N collectively referred as IoT device 104), an Internet of things (IoT) server 116, a management console 126, and a plurality of user devices 130-1, 130-2, 130-N. In an example, a software may be installed on a user device 130. It may be noted that the one or more users may access the IoT device 104 through a plurality of user devices 130-2, 130-3 . . . 130-N collectively referred as a user device 130. The user device 130 may be connected to a management console 126 for communicating information from the IoT device 104. The management console 126 may be a part of network 114. The management console 126 may act as an Application Programming Interface (API) for connecting the plurality of user device 130 with the IoT server 116 to visualize status of the IoT device 104 and status of sensors and actuators connected to the IoT device 104.

The management console 126 may be configured to receive transcoded data from the Internet of Things (IoT) server 116 or third party IoT gateway 124, and also send the transcoded data to the user device 130. It may be noted that the transcoded data may also be referred to as transcoded raw data. Further, the management console 126 may be configured to send transcoded data to the IoT server 116 or third party IoT gateway 124. Optionally, the management console 126 may be configured to send transcoded data to the IoT server 116 or third party IoT gateway 124, in response to the transcoded data received from the IoT server or third party IoT gateway. The management console may be configured to display the transcoded data and a historical data of the sensors, and control data to change operating states of the actuators. In some embodiments, the management console 126 may be configured to receive instructions from the user device 130, process the received instructions in desired format, and transmit the processed instructions to the IoT device 104 through the IoT server 116. The IoT device 104 may receive the response from the user device 130 for a request.

It will be understood that the sensor and the actuator connected to the IoT device 104 may be accessed and controlled by multiple users through the user device via the management console routed through the IoT server. Examples of the user device 130 may include but are not limited to, a portable computer, a personal digital assistant, a handheld device, and a workstation. The user device 130 are communicatively coupled to the IoT device 104 via the management console 126 through a network 114.

In one implementation, the network 114 may be a wireless network, a wired network, or a combination thereof. The network 114 can be implemented as one of the different types of networks, such as intranet, local area network (LAN), wide area network (WAN), the internet, and the like. The network 114 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 114 may include a variety of network devices, including routers, bridges, servers, computing devices, storage devices, and the like.

In one embodiment, the IoT device 104 may include at least one processor 106 (also referred as a first processor 106), an input/output (I/O) interface 108, a memory 110, and a communication module 112. The first processor 106 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the first processor 106 may be configured to fetch and execute computer-readable instructions stored in the memory 110. In some embodiment, the first processor 106 may be a microcontroller.

The I/O interface 108 may include a variety of software and hardware interfaces, for example, a web interface, a graphical user interface, and the like. The I/O interface 108 may enable the IoT device 104 to communicate with at least a sensor and an actuator of the one or more sensors and actuators 102 using a data bus protocols such as, but not limited to I2C, SPI, UART and the like. The IoT device communicates to the network using the communication module 112. The communications module 112 may use a wired or wireless communication network. The IoT device 104 may report data to the IoT server 116 in the network 114 periodically. The IoT server 116 may include at least one processor 118 (also referred as a second processor 118), an input/output (I/O) interface 120, and a memory 122. The I/O interface 120 may enable the IoT server 116 to communicate with other network devices, such as web servers and external data servers (not shown). The optimized raw data from the IoT device 104 may be communicated to the management console 126 either directly from the IoT server 116 or through a third party IoT gateway 124. It may be noted that the optimized raw data may comprise the raw data having optimized data transmission size of the data type. The IoT sever 116 may transcode the optimized raw data transmitted from the IoT device 104 and communicate to the management console 126. The user device 130 may visualize the data via the management console 126 that is located within the network 114.

The communications module 112 can facilitate multiple communications within a wide variety of networks and protocol types, including wired communication networks, for example, LAN, cable, etc., and wireless communication networks, such as WLAN, cellular, or satellite. The I/O interface 108 may include one or more ports for connecting at least one of the sensor and the actuator from the one or more sensors and actuators with the IoT device 104. The second processor 118 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the second processor 118 may be configured to fetch and execute computer-readable instructions stored in the memory 122.

The memory (110, 122) may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory (110, 122) may include routines, programs, objects, components, data structures, etc., which perform particular tasks or implement particular abstract data types. The memory (110, 122) may include programs or coded instructions that supplement applications and functions of the IoT device 104. In one embodiment, the memory (110, 122) amongst other things, serves as a repository for storing data processed, received, and generated by one or more of the programs or the coded instructions.

As there are various challenges observed in the existing art, the challenges necessitate the need to build the system 100 for optimizing the data communication of the IoT device 104 over a network. At first, at least one of a sensor and an actuator from the one or more sensors and actuators (102a, 102b, 102c, 102d, 102e, 1020 may be connected to the IoT device 104. At least one of the sensor and the actuator may communicate with the IoT device 104 via the I/O interface 108. Further, the IoT device 104 may communicate with the IoT server 116 using the communications module 112 in order to communicate with the user device 130 via the management console 126. The detail functioning of the system 100 is described below with the help of FIGS. 1-4c.

The system may comprise one or more IoT devices, an IoT server, a management console, and a plurality of user devices. The IoT device 104 comprises a first processor(s) 106 coupled to the memory 110 and at least one of the sensor and the actuator from the one or more sensors and actuators (102a, 102b, 102c, 102d, 102e, 1020 connected to the Internet of Things (IoT) device 104. The processor 106 is configured to execute instructions stored in the memory. Initially, the IoT device 104 may connect with at least one of the sensor and the actuator. Further, the IoT device 104 may identify attributes of at least one of the sensor and the actuator.

Subsequently, the IoT device 104 may receive raw data from at least one of the sensor and the actuator connected to the IoT device 104. The IoT device may be connected to at least one of the sensor and the actuator of the one or more sensors and actuators by at least one of a physical connection and a wireless connection. The raw data received from the sensor may comprise environmental data, positional data, automation data, computed data, contextual data, situational data and actionable data. The raw data received from the actuator may comprise control data corresponding to operating states of the actuator. The IoT device 104 may identify attributes of the sensors (102a, 102b, 102c) and the actuators (102d, 102e, 102f). The IoT device may receive raw data from the sensor and the actuator. The raw data may be received by connecting the sensor and the actuator to appropriate processor data buses such as, but not limited to, I2C, SPI, UART and the like of the I/O interface 108 connected to the processor 106. The IoT device 104 may receive raw data based on the attributes of the sensor and the actuator. The raw data generated from the one or more sensors and actuators (102a, 102b, 102c, 102d, 102e, 102f) may be communicated to the IoT device 104 over a network communication interface 112 using the communication protocol. The communication protocol may be a raw socket communication protocol that is known as microTLS. The microTLS protocol is a lightweight communication framework developed specifically for resource-constrained micro-controllers. The microTLS protocol is based on the industry standard Transport Layer Security (TLS) protocol. The microTLS protocol provides a secure communication platform to access at least one of the micro-controllers and the one or more sensors and actuators (102a, 102b, 102c, 102d, 102e, 102f) connected to the IoT device 104. Further, the microTLS protocol assists the developers in a resource-constrained environment by handling process related to encryption and decryption during data communication between client and server, but also the provisioning and updates of firmware remotely.

After receiving the raw data, the IoT device may define data types of the raw data based on the attributes. Further, the IoT device 104 may define a bit stream storage (also referred to as compact storage) for each of the data types based on the attributes. The compact storage may be defined in bit stream concepts. The bit stream concepts may refer to a sequence of bits or binary sequence of data defined to store each of the data types in a compact manner. The data types may include but are not limited to an integer, enumerations, bitfield, range, scalar, and strings. The data types may assist the IoT device 104 to define the attributes of the sensors and actuators. Further, the data types may assist the IoT device 104 to define the communication data packet format and associated compacting and extraction of values over the system 100. The data types may be used to represent attributes or parameters measured by the sensors and actuators used in the system. For example, in a temperature sensor, the attributes that are measured have to be communicated to the user device. The measured attributes may be a temperature range, maximum temperature, minimum temperature, thresholds for temperature range and so on. The data types are defined appropriately to obtain correct definition for the raw data. Appropriate definitions for the raw data ensure lossless communication during optimization of data transmission size of the data types of the raw data. In another example, in GNSS location tracker, measured attributes may be an altitude, latitude and so on.

For example, the 'bitfield' data type may be used for flags, where multiple bits can be set at the same time to represent a specific state. The 'enum' data type may be used to select a single value from a range of values. The 'range' data type may be used to select a range (i.e. minimum, maximum) to map into a set of bits. The 'scalar' data type may be used to select a scale and offset to map to a set of bits to raw data. The 'integer' data type may be used to select a signed or unsigned whole number into a set of bits. The 'string' datatype may be a NULL-terminated series of characters. A detailed explanation of the data types is described in upcoming descriptions.

Referring now to the data type related to 'bitfield', the bitfield data type may allow reservation of a specific number of bits to represent TRUE/FALSE values (Boolean) where multiple conditions can be defined at the same time. Each entry utilizes a bit in a data packet and a maximum number of entries may be defined as a bitdepth.

For example, the bitfield data type and bitdepth for defining the status of an automobile may be defined as mentioned below:

```
{
  "name": "Car Status Flags",
  "format": "bitfield",
  "value":
  {
    "bitdepth": 7,
    "items":
    [
      { "bit": 6, "meaning": "Driver Seated" },
      { "bit": 5, "meaning": "Head Lights On" },
      { "bit": 4, "meaning": "Parking Lights On" },
      { "bit": 3, "meaning": "Boot Door Open" },
      { "bit": 2, "meaning": "Right Front Door Open" },
      { "bit": 1, "meaning": "Left Front Door Open" },
      { "bit": 0, "meaning": "Fuel Cap On" }
    ]
  }
}
```

Here, the bitdepth may be 7 and for the bits 0-6, the bitfield may be defined for referring to the state of an automobile through the management console 126. In the above case, if the value '0' is not set means, then all the other conditions are treated as FALSE. The number of possible values is $2^n-1$. That is, the bitfield has 127 possible values, when the bitfield value is 97 (64+32+1), 1100001 in binary, it may indicate that the driver is seated ($2^6$=64), the head lights are on ($2^5$=32) and the fuel cap is on (1).

Referring now to the data type related to 'enumerations', the data type enumerations may allow the selection of a single element from a list of values. The index acts as a lookup table that may include values, the number of possible values is $2^n-1$. Here 'n' represents the bitdepth defined which means not all possible values may be utilized.

For example, the enum (enumeration) data type and the bitfield data type for defining a gear position of the automobile may be defined as mentioned below:

```
{
  "name": "Gear Position",
  "format": "enum",
  "value":
  {
    "bitdepth": 3,
    "items":
    [
      { "index": 0, "meaning": "P" },
      { "index": 1, "meaning": "R" },
      { "index": 2, "meaning": "N" },
      { "index": 3, "meaning": "D" },
      { "index": 4, "meaning": "1" },
      { "index": 5, "meaning": "2" }
    ]
  }
}
```

In the above case, seven items can be defined ($2^3-1$=7) based on the value of the bitdepth. When a value of 3 may be provided, it refers to the "Drive" position of the gear stick and no other values are distinct and not used.

Referring now to the data type related to 'range', the range data type may allow a reservation of a specific number of bits to store a range of values. The entire bit range may be utilized to produce a value between 0 and $2^n-1$, where n represents the defined bitdepth. The provided value may be then scaled across the range (maximum-minimum) of potential values over the number of possible values, and offset by the minimum value.

For example, the range data type and bitfield of temperature can be defined as mentioned below:

```
{
    "name": "Temperature",
    "format": "range",
    "value":
    {
        "bitdepth": 8,
        "minimum": -40,
        "maximum": 100,
        "units": "degrees C"
    }
}
```
value = (data * (maximum − minimum)/($2^{bitdepth}-1$)) + minimum;

In the above case, the bitdepth defines 255 possible values [i.e. ($2^8-1=255$)]. The value of 0 represents the minimum value of −40 degrees C., and the value of 255 represents the maximum value of 100 degrees C. Any value in between, is mapped on a linear scale, using the provided formula. The value of 127 can be represented as just under halfway between minimum and maximum, which is 29.725 degrees C. The more bits may be reserved by the data type, the more refined and accurate the eventual calculated value.

Referring now to the data type related to 'scalar', the scalar data type may be similar to the range data type that allows the reservation of a specific number of bits to store a range of values. The entire bit range may be utilized to produce a value between 0 and $2^n-1$, where n represents the bitdepth defined. The provided value may be then scaled using a multiplier and then offset by a specific value. Instead of mapping to a range, the resolution of accuracy may be defined by the multiplier. For example, the GNSS latitude can be defined using the scalar data type as mentioned below:

```
{
    "name": "Latitude",
    "format": "scalar",
    "value":
    {
        "bitdepth": 32,
        "signed": true,
        "multiplier": 0.0000001,
        "offset": 0,
        "units": "degrees"
    }
}
```

In the above case, the bitdepth, reserving one-bit for sign of 32 defines a possible value between −2,147,483,648 and 2,147,483,647. When applying a multiplier provided for the scalar data type, the provided value may be then converted to a value between −214.7483648 and 214.7483647, which is more than sufficient to store the GNSS latitude attribute value. An advantage is that the value is effectively decimal point accurate and as such is identifiable from the provided value easily. The use of the range data type can improve the accuracy when using a same bitdepth. If the data type reserves more bits, then more refined and accurate values can be calculated.

Referring now to the date type related to 'integer', the integer data type may allow the representation of a signed or unsigned whole number (integer). For example,

```
{
    "name": "fix",
    "format": "integer",
    "value":
```

```
    {
        "bitdepth": 1,
        "signed": false,
        "units": ""
    }
}
```

In the above case, the bitdepth defines that a single bit is used and that the possible value is an unsigned integer can have a value of 0 or 1.

Referring now to the data type related to 'string', that allows the representation of a NULL-terminated string. For example,

```
{
    "name": "message",
    "format": "string"
}
```

Thus, the data types and compact storage are defined for the raw data based on the attributes. The data types and compact storage in bit stream concepts may be defined for optimal data communication without data loss. The compact storage defined in the bit stream concepts may refer to a sequence of bits or binary sequence of data that are defined to store each of the defined data types in a compact manner. The data types may include integers, enumerations, bitfields, ranges, scalars, and strings.

After performing the data definitions for different data types, the data transmission size of the data types and storage in bit stream concepts may be optimized by the processor using the communication protocol. In one implementation, the communication protocol is a raw socket communication protocol that includes but is not limited to micro Transport Layer Security (microTLS) protocol. The data transmission size of the data types and compact bit stream concepts may be further optimized by removing the communication overhead of existing protocols such as Hyper-Text Transfer Protocol (HTTP), Constrained Application Protocol (COAP) and the like using the raw socket communication protocol. The raw socket communication protocol enables a user/a developer to define every section of the packet. That is, the raw socket protocol may enable the system to determine header and payload data prior to transmission to the management console.

The data types and compact storage in the bit stream concepts may be defined for the raw data of the IoT device for optimal data communication without data loss. The optimized raw data from the IoT devices may be communicated to the IoT server in the network. The optimized raw data may comprise the raw data having optimized data types. Further, the optimized raw data may be transcoded into a desired format at the IoT server for relaying transcoded raw data via an IoT gateway at the IoT server to the management console or a third party IoT gateway. The transcoded raw data may comprise the optimized raw data transcoded into the desired format. It should be noted that the desired format by third-party services comprises Java Script Object Notation (JSON), Extensible Markup Language (XML), Extensible Messaging Presence Protocol (XMPP), and the like. Further, the system can update firmware via the IoT server when instructed by an administrator in the management console. For example, the data types and compact storage in bit stream concepts are updated using the firmware updates received over the communication protocol. The management console for the firmware updates is described under FIG. 3 description. The one or more Internet of things (IoT) devices may transmit optimized raw data to the plurality of user devices in real-time. An exemplary scenario for defining and optimizing the data from the IoT devices for communication is described in-detail in connection to the FIGS. 4a-4c description.

Figure 2:
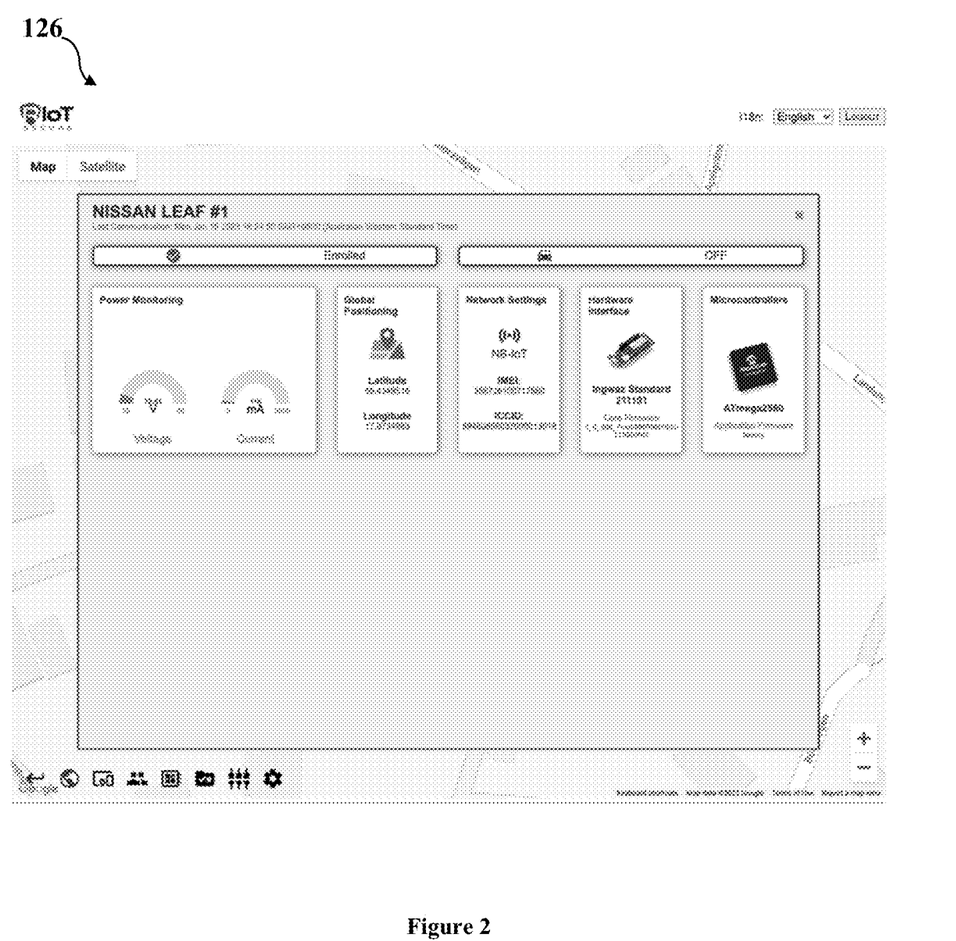
FIG. 2 illustrates an exemplary management console, in accordance with an embodiment of the present subject matter.

Referring now to FIG. 2, an exemplary management console 126 for communicating data from one or more Internet of Things (IoT) devices is illustrated. The management console is an Application Programming Interface (API) in the network to visualize a status of the IoT devices. In some embodiment, the management console acts as a virtual device in the network to visualize a status of the IoT devices. The management console may receive transcoded data from an Internet of Things (IoT) server or a third party IoT gateway. It should be noted that the transcoded data is generated at the IoT server based on optimized data received from one or more IoT devices. The management console may connect a plurality of user devices with the IoT server. The IoT server may communicate with one or more IoT devices through the network. In an embodiment, the management console may display the transcoded data and a historical data of the one or more sensors, and control data for the one or more actuators to the plurality of user devices. The historical data of the one or more sensors may include but is not limited to previous instructions or updates provided to the sensors. The control data to change operating states of the actuator may include but is not limited to instructions to activate or deactivate certain operations of the actuators. The transcoded data from each of the one or more IoT devices may be related to power monitoring data, positioning data, network settings, hardware interface, microcontroller of the IoT device. In some embodiment, the management console may send transcoded data to the IoT server or the third party IoT gateway without any reception of transcoded data from the IoT server or third party gateway. Optionally, the management console may send transcoded data to the IoT server or the third party IoT gateway in response to the transcoded data received from the IoT server.

Figure 3:
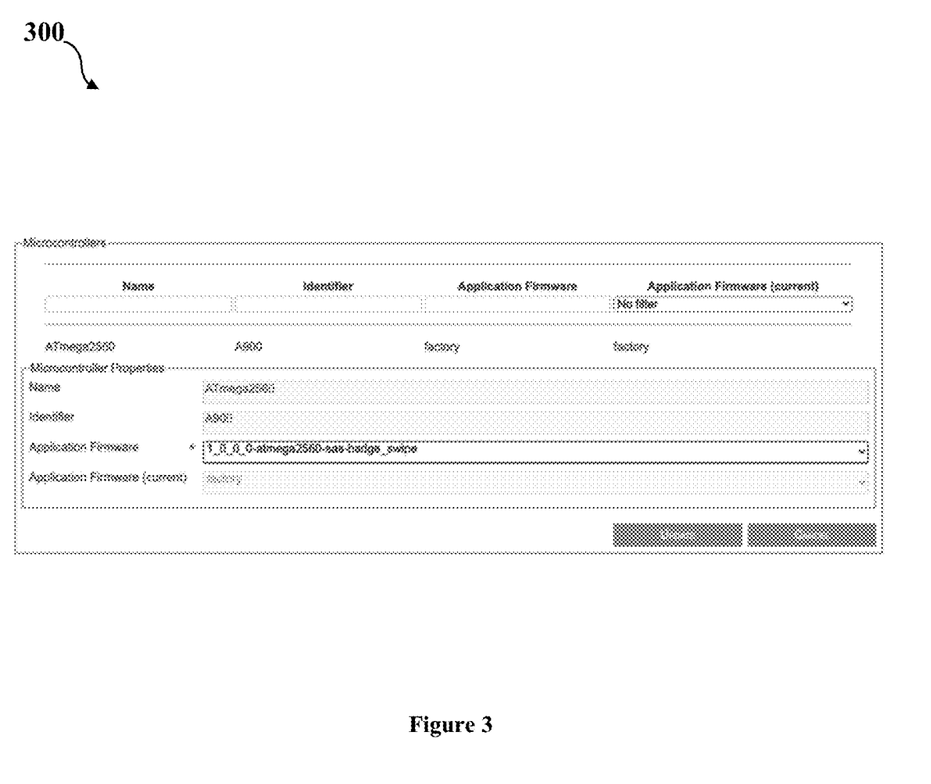
FIG. 3 illustrates a firmware update transmission to one or more Internet of Things (IoT) devices in management console, in accordance with an embodiment of the present subject matter.

Referring now to FIG. 3, an exemplary firmware updates transmission 300 to one or more Internet of Things (IoT) devices in management console is illustrated. The management console may indicate that firmware updates for the IoT devices are available, once assigned by an administrator of the management console. The firmware updates for the IoT devices are transmitted automatically to the IoT devices from the IoT server. The IoT server may transmit firmware updates to the IoT devices, when instructed by an administrator in the management console. It should be observed that the firmware updates are pushed according to microcontroller properties. For example, the microcontroller properties of the IoT device may include but are not limited to name, identifier, application firmware, current application firmware and so on.

Figure 4A:
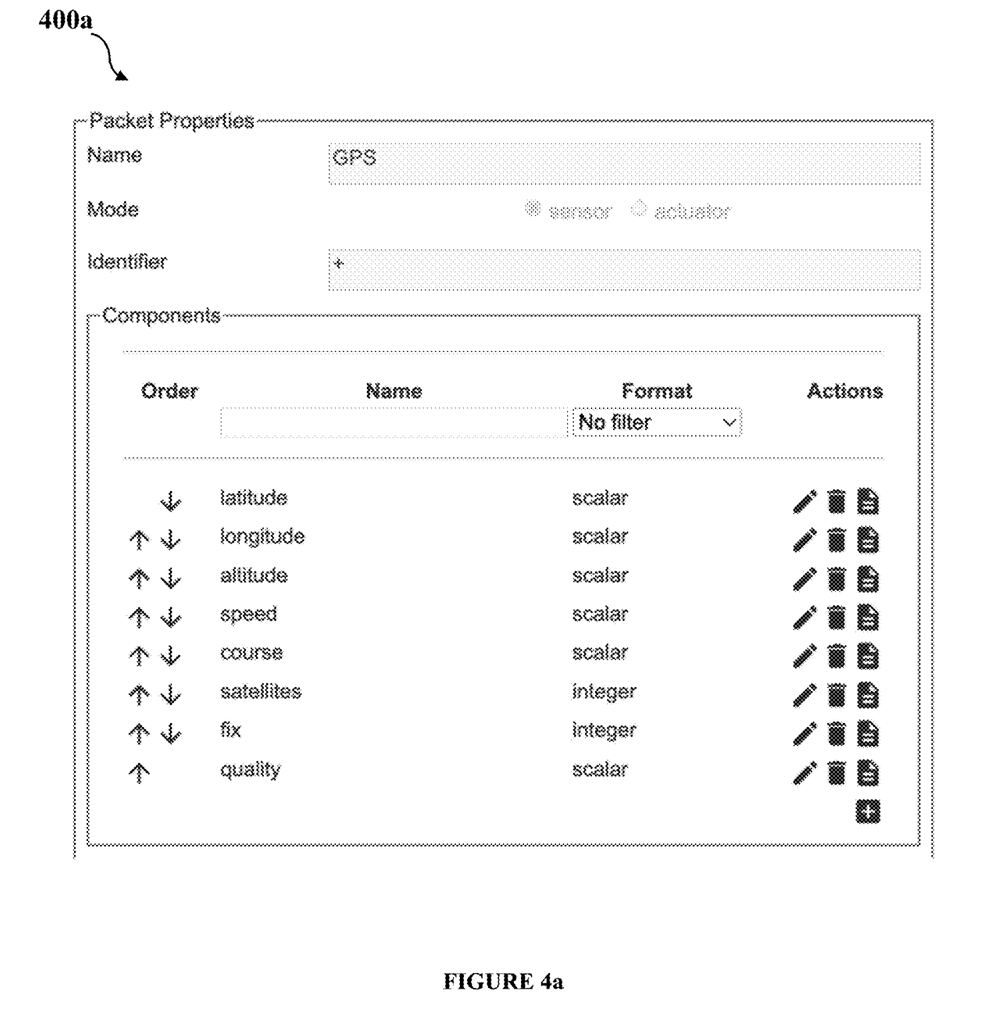
FIGS. 4a and 4b illustrates exemplary packet properties and bit stream representation for optimizing data definition of positional information (GNSS location), in accordance with an embodiment of the present subject matter.

Referring now to FIG. 4a, exemplary packet properties 400a for optimizing data definition of positional information (Global Navigation Satellite System (GNSS) location) are illustrated according to an embodiment. In an exemplary scenario, attributes in connection to the GNSS location tracking device can be defined using data types. The packet properties of raw data that represent GNSS (location) information may include but are not limited to the name of the IoT device, mode of operation (i.e. sensor or actuator), type of identifier, and a list of components. The list of components may include the order in which the attributes of the GNSS location tracking device may be organized, the name of the attribute, the format of the data type, and actions for each attribute. The actions for each attribute may be related to editing the range or value with respect to the attribute, deletion of the attribute, and information regarding the attribute. In this example illustrated in FIG. 4a, a number of different data types are defined. The data types used in the below mentioned example are scalar and integer data types.

For example, typical raw data received from the GNSS location tracking devices are as mentioned below (encoded as hexadecimal dump for clarity):
00000000 02 28 25 05 32 13 23 2b 10 23 8e c5 e5 0a b2 1b |.(%.2.#+.# . . . |
00000010 67 07 25 00 00 63 d8 09 8b 4a 03 |g.%..c . . . J.|

In this, there is a starting and ending character such as a timestamp, checksum and the actual data itself, the #+ sequence indicates a GNSS data packet. Further, the data types are logically stored in terms of their signees and the number of bits used in the bit stream as mentioned below.

```
// #+ = gps tag
// len = 16 (128 bits)
// {
//          int32_t latitude * 10000000
//          int32_t longitude * 10000000
//          int16_t altitude * 100          units: m
//          uint16_t speed * 100            units: knots
//          uint16_t course * 100           units: deg
//          uint8_t satellites
//          binary fix                      0 = NO, 1 = YES
//          uint7_t quality * 10
// }
// cs = checksum
```

Further, the raw data on the IoT device is prepared for a GNSS encoding. The GNSS encoding can be performed using 'C' coding language. The sample C code for GNSS encoding can be framed as mentioned below:

```
*p++ = '#';
*p++ = '+';
*p++ = 16;
WRITE_32_BE(p, gps.latitude);   p += 4;
WRITE_32_BE(p, gps.longitude);  p += 4;
WRITE_16_BE(p, gps.altitude * 100); p += 2;
WRITE_16_BE(p, gps.speed * 100); p += 2;
WRITE_16_BE(p, gps.course * 100); p += 2;
*p++ = gps.satellites;
*p++ = (gps.fix ? 0x80 | MIN(0x7F, (uint8_t)(gps.HDOP * 10)) : 0x00);
```

Figure 4B:
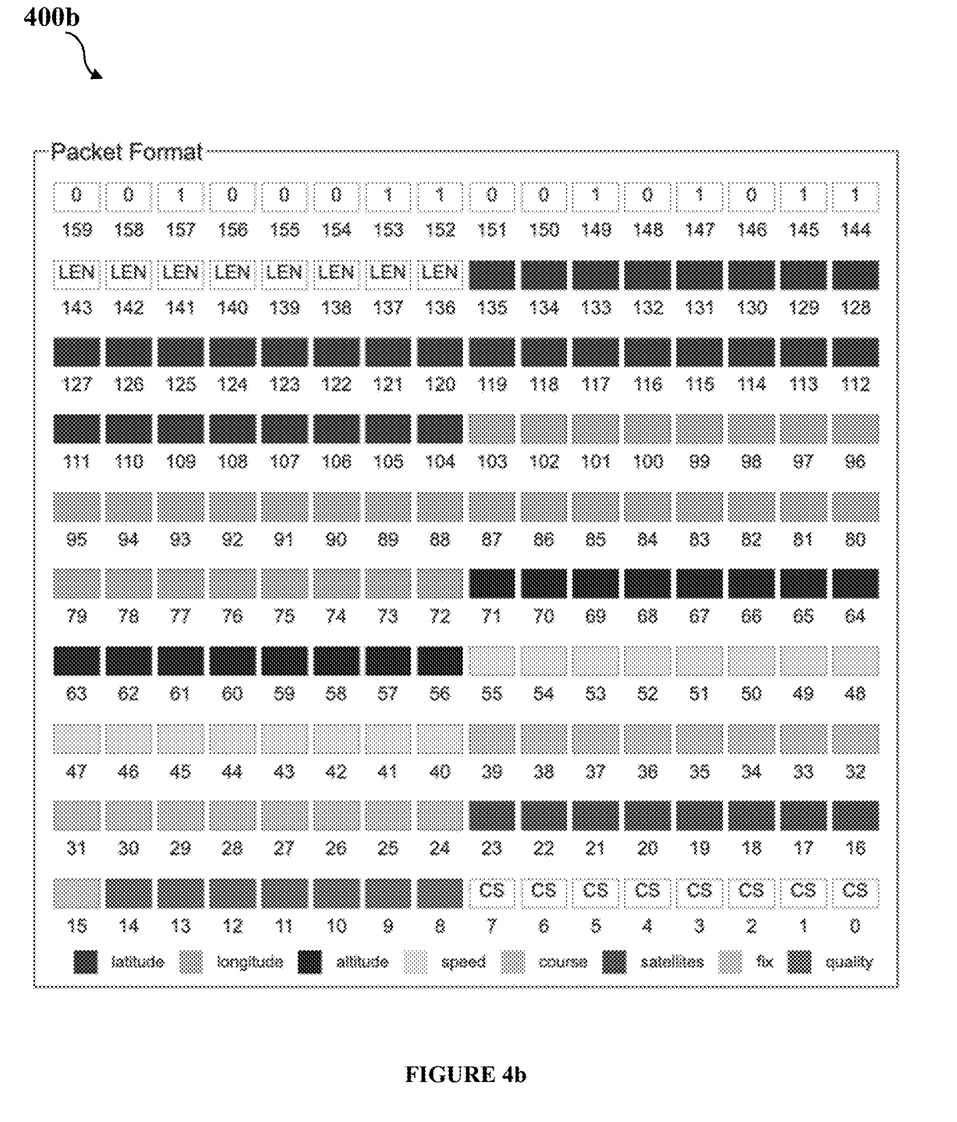

Referring now to FIG. 4b, an exemplary bit stream representation (i.e. packet format) 400b for optimizing data definition of positional information (GNSS location) is illustrated according to an embodiment. Regarding the bit stream representation, the GNSS location tracking device uses 160 bits of information. In the packet format, the first two bytes represent the packet identifier, and the third byte represents the length. The last byte is referred to as a checksum for integrity purposes. The data can use a different number of bits to store. For example, 'fix' uses one bit that is either 0 or 1, and quality uses 7 bits, which is a value between 0 and 127 (i.e. $2^7$-1). Other data elements can use 16 or 32 bits for the data.

Figure 4C:
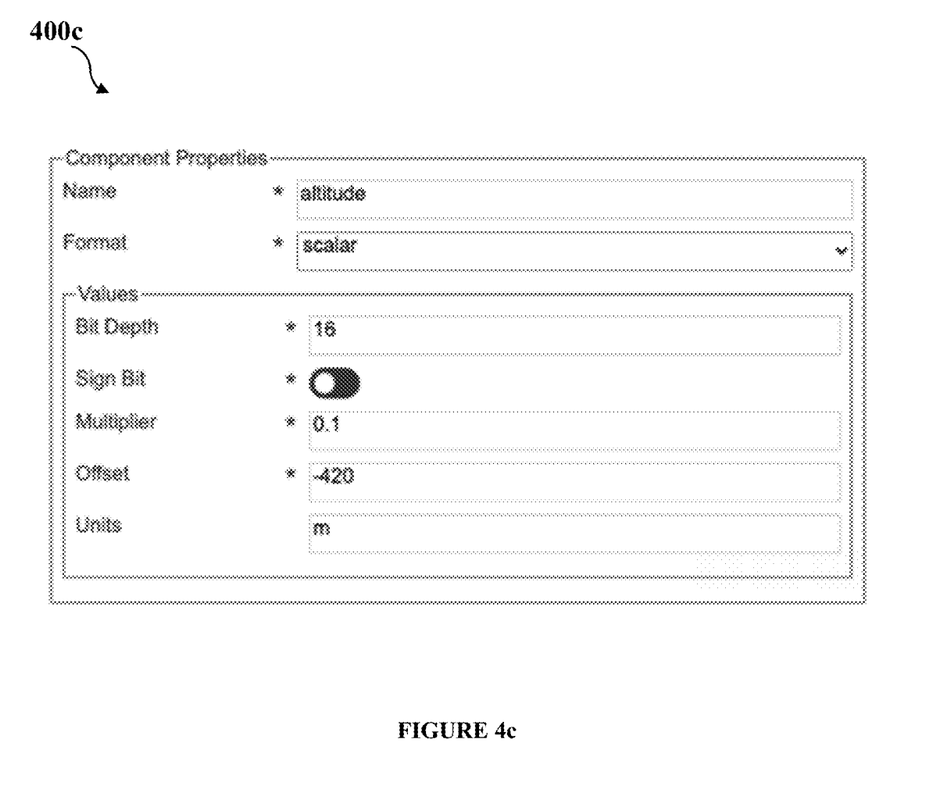
FIG. 4c illustrate an exemplary component properties for optimizing attribute (for example, altitude attribute) of the GNSS location respectively, in accordance with an embodiment of the present subject matter.

Referring now to FIG. 4c, exemplary component properties for optimizing attribute (for example, altitude attribute) of the GNSS location are illustrated according to an embodiment. Conversion of the bit stream to values is defined for each component property. Further, internal rules for converting the bit stream to values are defined within the definition of each component/attribute. For example, the component properties for altitude may provide the internal rules for converting the bit stream to values. In the component properties for altitude, the values are defined as 16 for bitdepth, sign bit disabled, multiplier, offset, and corresponding units are mentioned. In this example, the bitdepth '16' is used for the component altitude. The sign bit is disabled because the altitude is positive. The resulting value will be between 0 and 65535 which is then multiplied by the multiplier value '0.1'. Now, the resulting value after applying the multiplier can be between 0 and 6553.5. Further, the offset is set as '420' to produce a value in meters representing the altitude above sea level. That is, the resulting value after applying the offset can be between −420 and 6133.5.

Below mentioned is a sample instruction for transcoding GNSS location data before transmitting it to the management console/mobile devices. The data in the binary format is converted to JSON. The transcoding can also be performed by third-party services such as XML, XMPP, and the like.

```
// func
// util_packet_stream_decode(session DeviceSession,
// data [ ]uint8, len uint) (uint8, [ ]uint8)
//
// convert a specific binary stream into human readable JSON buffer
// @param json_session a session specific to the device
// @param data the binary stream
// @param len the number of bytes in the binary stream
// @return a status code and a buffer with JSON coding of binary stream
func
util_packet_stream_decode(session DeviceSession,
data [ ]uint8, len uint) (uint8, [ ]uint8)
```

The transcoded data may be provided to the management console directly from the IoT server. In some embodiments, the transcoded data may be relayed to the management console from the IoT server or the third party IoT gateway. In some embodiment, the transcoded data may be relayed from the management console to the IoT server or the third party IoT gateway. Below mentioned may be the transcoded GNSS location data that is communicated to the management console.

```
"packets": [
  {
    "ts":1662026150250,
    "GPS":
    {
      "latitude":59.6559333,"longitude":17.9444583,"altitude":18.29,
      "course":255.6,"fix":1,"quality":1.1,"satellites":9"speed":0
    }
  }
]
```

The size of the final data that has to be transmitted from the IoT device to the IoT server may be reduced to 22 bytes, while being able to restore an original payload of 200 bytes. Thus, by defining the data types, and compact storage in bit stream concepts, a final payload data that has to be transmitted to the IoT server can be reduced. Further, by optimizing the data types and compact storage in bit stream concepts using the raw socket communication protocol, the data transmission size can be further reduced. It should be observed that final payload is 22 bytes, compared to 200 bytes and 2000 bytes with traditional communication protocols—a 99% reduction with the use of the raw socket communication protocol. As a result, overall resource usage for the data communication in the IoT devices communication can be optimized. Further, efficient, and secure data communication is also ensured.

A flow diagram of a method 500 for optimizing data communication of IoT devices over a network is described with reference to FIG. 5. The method 500 is illustrated as a collection of operations in a logical flow graph representing a sequence of operations that can be implemented in hardware, software, firmware, or a combination thereof. The order in which the method steps are described is not intended to be construed as a limitation, and any number of the described method blocks can be combined in any order to implement the methods, or alternate methods. Additionally, individual operations may be deleted from the methods without departing from the scope of the subject matter described herein. In the context of software, the operations represent computer instructions that, when executed by one or more processors, perform the recited operations. Features that are described with reference to FIGS. 1-4c and are not repeated for the sake of brevity.

Figure 5:
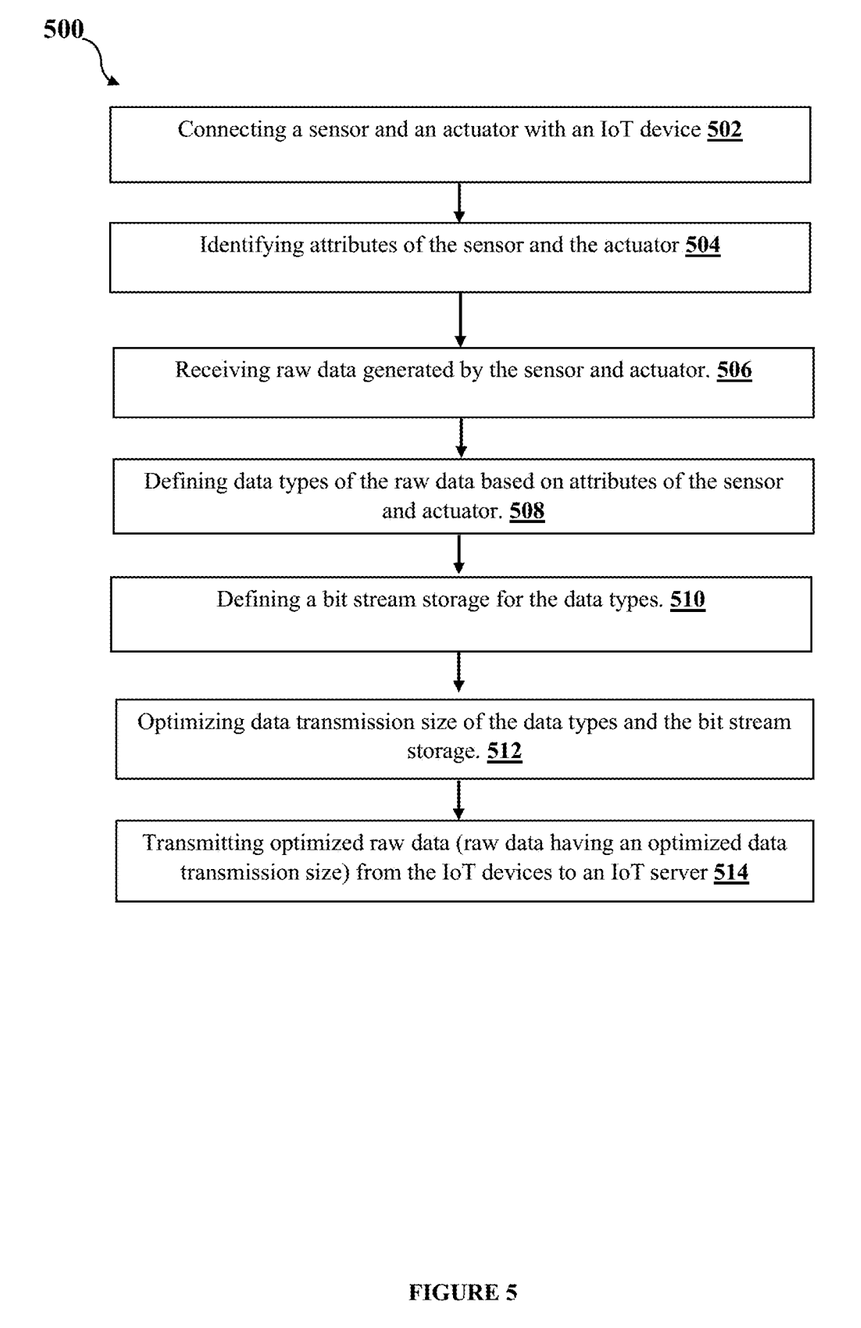
FIG. 5 illustrates a flow diagram of a method for optimizing data communication of IoT devices over a network, in accordance with an embodiment of the present subject matter.

Referring now to FIG. 5, the flow diagram of method 500 for optimizing data communication of IoT devices over a network is illustrated. The method for optimizing data communication of IoT devices over a network.

At block 502, the method for optimizing data communication of IoT devices over a network is initiated with a step of connecting an IoT device to at least one of a sensor and an actuator.

At block 504, an IoT device of the one or more IoT devices may identify attributes of at least one of the sensor and the actuator.

At block 506, the IoT device may receive raw data from at least one of the sensor and the actuator. The sensor and the actuator may be connected to the IoT device by at least one of a physical connection and a wireless connection. Further, the raw data may be received by the IoT device based on the attributes. The attributes may comprise labels of parameters that can be sensed by the sensor and labels of parameters that can be checked by the actuator. The raw data received from the sensor may include, but is not limited to, environmental data, positional data, automation data, computed data, contextual data, situational data, and actionable data. The raw data received from the actuator may comprise control data of the actuator. For example, in a GNSS location tracking device, the attributes of the sensor may include latitude, altitude, longitude, speed, course, satellites, fix, quality, and so on. The raw data may be 59.6559333, "longitude", 17.9444583, "altitude" and the like.

At block 508, data types may be defined by the IoT device for the raw data based on attributes.

At block 510, bit stream storage may be defined for the data types based on the attributes. The bit stream storage may correspond to an amount of storage set as a limit for the data types. The limit may be measured in bits. The data types and bit stream storage may be defined for the raw data for optimal data communication without data loss over the micro-Transport Layer Security (micro-TLS) protocol. The data types may include but are not limited to integer, enumerations, bitfield, range, scalar, and strings. Each data type has a specific bitdepth for representing the raw data.

At block 512, the data transmission size of the data types and the bit stream storage may be optimized using a communication protocol. Here, the data types and bit stream storage may be defined for the raw data. The communication protocol is a raw socket communication protocol that may include but is not limited to a micro Transport Layer (microTLS) protocol. The data transmission size of the data types and the bit stream storage may be optimized by removing the communication overhead of existing protocols such as Hyper Text Transfer Protocol (HTTP), Constrained Application protocol (COAP) and the like using the raw socket communication protocol. Using the raw socket communication protocol, existing communication protocol headers can be removed to further optimize the data transmission size.

At block 514, after optimizing the data transmission size of the data types and the bit stream storage using the raw socket communication protocol, the optimized raw data comprising raw data having an optimized data transmission size may be transmitted from the IoT devices to an IoT server in the network.

Further, the method may comprise receiving the optimized raw data on an IoT server. Subsequently, the method may comprise transcoding the optimized raw data into a desired format. Further, the method may comprise relaying the transcoded data to a management console. Further, the method may comprise receiving the transcoded data from the IoT server or the third party IoT gateway by the management console. The method may comprise connecting the plurality of user devices with the IoT server by the management console. The IoT server may communicate with one or more IoT devices through a network. The management console may display the transcoded data and a historical data of the one or more sensors, and control data to change operating states of the actuators to the plurality of user devices. In some embodiment, the management console may send transcoded data to the IoT server or the third party IoT gateway. The method further comprising transmitting firmware updates for the IoT devices from IoT server when instructed to by an administrator in the management console. The firmware updates for the IoT devices may be transmitted automatically.

Thus, by defining the data types and compact storage in bit stream concepts and optimizing the data transmission size, the method can reduce final data that has to be transmitted to the management console. It is to be noted that the one or more IoT devices, the IoT server, the management console, and the plurality of user devices are connected through the network. In some embodiments, the management console may act as a virtual device for connecting the plurality of user devices with the one or more IoT devices via the IoT server.

According to another embodiment, a non-transitory computer program product having embodied thereon a computer program for optimizing data communication of Internet of Things (IoT) devices over a network is provided according to a system 100 described in FIG. 1. The computer program product storing instructions and the instructions are executed for optimizing data communication of Internet of Things (IoT) devices over a network according to the system 100.

Exemplary embodiments discussed above may provide certain advantages. Though not required to practice aspects of the disclosure, these advantages may include those provided by the following features.

Some embodiments of the system and the method for optimizing data communication of the Internet of Things (IoT) devices over a network may improve resource utilization.

Some embodiments of the system and the method for optimizing data communication of IoT devices over the network may improve communications management between IoT devices and management consoles. That is, communication management in handling the data between IoT devices and the IoT server. The handling of the data includes but is not limited to processing, storing and so on.

Some embodiments of the system and the method for optimizing data communication of IoT devices over the network may ensure device security.

Some embodiments of the system and the method for optimizing data communication of IoT devices over the network may reduce cost of IoT device deployment, maintenance, and evolution.

Although implementations for methods and system for optimizing data communication of IoT devices over the network have been described in language specific to structural features and/or methods, it is to be understood that the appended claims are not necessarily limited to the specific features or methods described. Rather, the specific features and methods are disclosed as examples of implementations for optimizing data communication of IoT devices over the network (For example, software application).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system for optimizing data communication of Internet of Things (IOT) device over a network, the system comprises:

the Internet of Things (IOT) device connected to an actuator and a sensor, wherein the IoT device comprises a first processor and a first memory storing machine-readable instructions, wherein the first processor is configured to:
identify attributes of at least one of the sensor and the actuator;
receive raw data from at least one of the sensor and the actuator, wherein the raw data is received based on the attributes;
define data types of the raw data based on the attributes, wherein the data types comprise at least one of: integer, enumeration, bitfield, range, scalar, and string;
define a bit stream storage for the data types based on the attributes;
optimize a data transmission size of the data types and the bit stream storage using a communication protocol; and
transmit the raw data having the optimized data transmission size; and an IoT server to receive and process the raw data transmitted by the IoT device, wherein the IoT server comprises a second processor, and a second memory storing machine-readable instructions, wherein the second processor is configured to:
receive the raw data having the optimized data transmission size;
transcode the raw data into a desired format; and relay the raw data transcoded into the desired format to a management console, wherein the management console is configured to facilitate communication between the IOT device and the IoT server over a network, wherein the management console is configured to receive control data, from a user device indicating change of an operating state of the actuator.

2. The system of claim 1, wherein the desired format comprises at least one of XML, XMPP, and JSON.

3. The system of claim 1, wherein the management console is further configured to:
receive the raw data transcoded into the desired format from at least one of the IoT server and a third party IoT gateway;
connect the user device with the IoT server, wherein the IoT server communicates with the IoT device through the network;
display the raw data transcoded into the desired format and historical data of the sensor on the user device; and
transmit the control data to the IoT device to control the actuator connected to the IoT device.

4. The system of claim 1, wherein the IoT server is configured to indicate firmware updates available for the IoT device when instructed by an administrator in the management console, and wherein the firmware updates for the IOT device are transmitted automatically.

5. The system of claim 4, wherein a firmware of the IoT device is updated automatically, and wherein the firmware update is received from the IoT server.

6. The system of claim 1, wherein the change of the operating state of the actuator corresponds to an action performed by the actuator based on the control data.

7. The system of claim 1, wherein the network is a wireless network.

* * * * *